(12) United States Patent
Eränen et al.

(10) Patent No.: US 8,017,086 B2
(45) Date of Patent: Sep. 13, 2011

(54) CATALYST UNIT FOR REDUCTION OF NOX COMPOUNDS

(75) Inventors: Kari Eränen, Masku (FI); Edward Jobson, Romelanda (SE); Lennart Cider, Mölndal (SE); Lars-Eric Lindfors, Åbo (FI)

(73) Assignee: Volvo Technology Corporation, Gothenburg (SE)

( * ) Notice: Subject to any disclaimer, the term of this patent is extended or adjusted under 35 U.S.C. 154(b) by 948 days.

(21) Appl. No.: 10/908,857

(22) Filed: May 27, 2005

(65) Prior Publication Data

US 2008/0256934 A1 Oct. 23, 2008

Related U.S. Application Data

(63) Continuation of application No. PCT/SE03/01836, filed on Nov. 27, 2003, now abandoned.

(30) Foreign Application Priority Data

Nov. 27, 2002 (SE) ...................................... 0203538

(51) Int. Cl.
*B01D 50/00* (2006.01)
(52) U.S. Cl. ...................................................... 422/180
(58) Field of Classification Search .................. 422/168, 422/180, 177; 60/274, 286
See application file for complete search history.

(56) References Cited

U.S. PATENT DOCUMENTS

| | | | |
|---|---|---|---|
| 5,155,994 A | 10/1992 | Muraki et al. | |
| 5,237,939 A * | 8/1993 | Spokoyny et al. | 110/345 |
| 5,658,543 A | 8/1997 | Yoshida | |
| 6,192,675 B1 | 2/2001 | Hirota et al. | |
| 6,314,722 B1 | 11/2001 | Matros | |
| 2002/0056273 A1 | 5/2002 | Itoh et al. | |

FOREIGN PATENT DOCUMENTS

| | | |
|---|---|---|
| EP | 0496526 A1 | 7/1992 |
| EP | 0533460 A1 | 3/1993 |
| EP | 0714693 A1 | 6/1996 |
| EP | 0719580 A1 | 7/1996 |
| EP | 0935055 A2 | 8/1999 |

(Continued)

OTHER PUBLICATIONS

International Search Report for International Patent Application PCT/SE2003/001836, dated Feb. 2, 2004.

(Continued)

*Primary Examiner* — Tom Duong
(74) *Attorney, Agent, or Firm* — Novak Druce + Quigg LLP

(57) ABSTRACT

A catalyst unit (1; 1') configured for the reduction of $NO_x$ compounds in a gas stream and which includes a catalytically active material of the silver/alumina type. The catalyst unit (1; 1') has at least one first reaction zone (3a, 3b, 3c, 3d, 3e) containing the catalytically active material and at least one second reaction zone (4a, 4b, 4c, 4d, 4e; 8a, 8b, 8c, 8d, 8e) which is arranged to permit breakdown of a gas species which is formed in the first reaction zone (3a, 3b, 3c, 3d, 3e), with $N_2$ being formed, and in that the gas stream is conducted through the first reaction zone (3a, 3b, 3c, 3d, 3e) and the second reaction zone (4a, 4b, 4c, 4d, 4e; 8a, 8b, 8c, 8d, 8e). The invention results in an improved catalyst unit which in particular provides high-grade reduction of $NO_x$ compounds in an exhaust gas stream from a combustion engine.

32 Claims, 2 Drawing Sheets

FOREIGN PATENT DOCUMENTS

| | | | |
|---|---|---|---|
| EP | 0947235 | A1 | 10/1999 |
| EP | 0947236 | A1 | 10/1999 |
| JP | 04-243525 | | 8/1992 |
| JP | 08042329 | A2 | 2/1996 |
| JP | 11-342339 | | 12/1999 |
| JP | 2000002111 | A2 | 1/2000 |
| JP | 2002-242664 | | 8/2002 |
| JP | 2001-159360 | | 7/2010 |
| WO | WO 0216014 | A1 | 2/2002 |

OTHER PUBLICATIONS

Extended European Search Report; EP09012923.0; issued Jan. 29, 2010.

English translation of Office Action received in corresponding Japanese Application No. 2004-555209 dated Apr. 12, 2010.

* cited by examiner

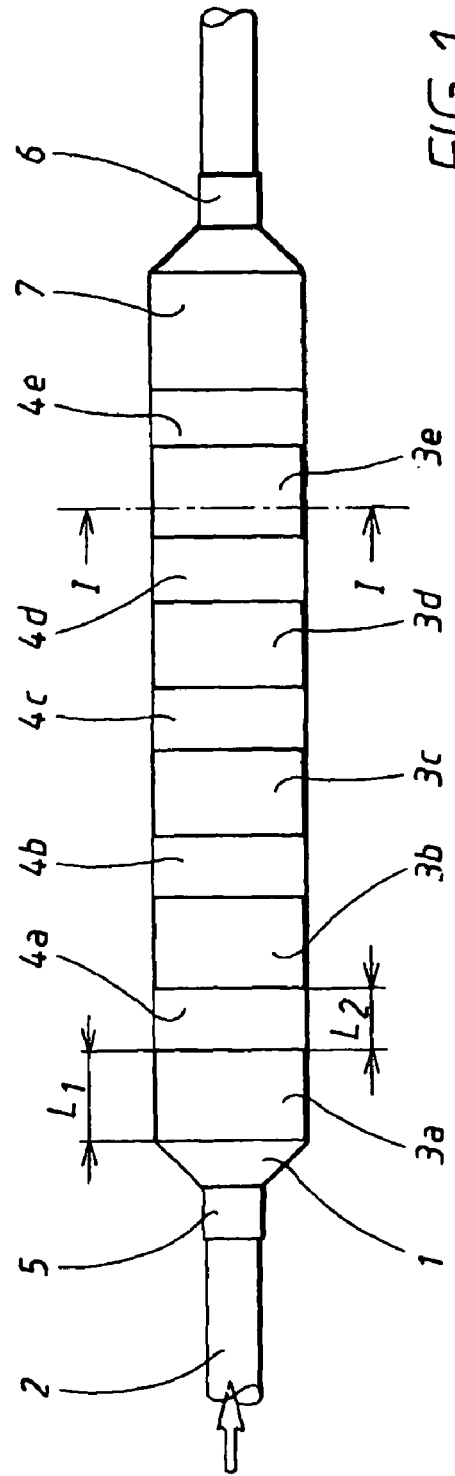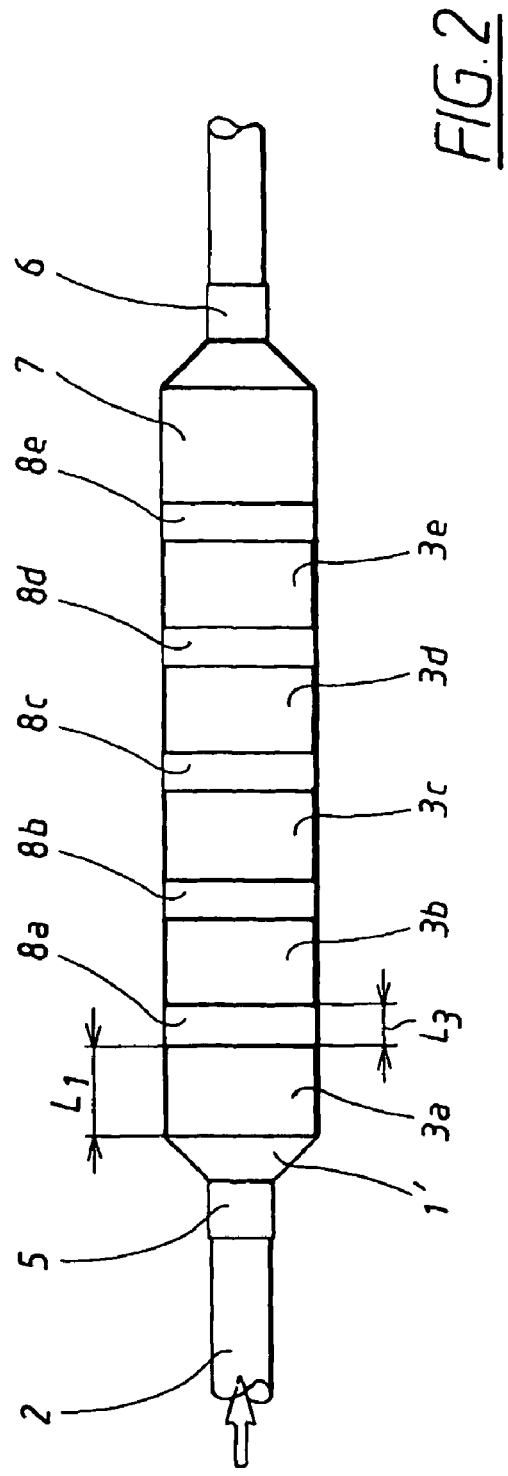

CATALYST UNIT FOR REDUCTION OF NOX COMPOUNDS

CROSS-REFERENCE TO RELATED APPLICATIONS

The present application is a continuation patent application of International Application No. PCT/SE2003/001836 filed 27 Nov. 2003 which was published in English pursuant to Article 21(2) of the Patent Cooperation Treaty, and which claims priority to Swedish Application No. 0203538-4 filed 27 Nov. 2002. Said applications are expressly incorporated herein by reference in their entireties.

TECHNICAL FIELD

The present invention relates to a catalyst unit for reduction of $NO_x$ compounds in a gas stream, and which unit includes a catalytically active material of the silver/alumina type.

BACKGROUND OF THE INVENTION

In connection with vehicles which are operated with the aid of combustion engines, there is a general requirement for low discharges of harmful substances in the exhaust gases from the engine. These substances principally consist of compounds in the form of nitrogen oxide compounds ($NO_x$), hydrocarbon compounds (HC) and carbon monoxide (CO). According to what is known, the exhaust gases from a conventional petrol engine can be purified using an exhaust gas catalyst which forms part of the exhaust gas system and to which the exhaust gases are conducted. In an exhaust gas catalyst of the three-way catalyst type, the greater part of the abovementioned harmful compounds are eliminated by means of known catalytic reactions. In order to optimize the function of the catalyst, so as to ensure that it affords as large a purifying effect as possible as far as $NO_x$, HC and CO compounds are concerned, the engine is operated, in most operational cases, using a stoichiometric air/fuel mixture, i.e. a mixture in which $\lambda=1$. A computer-based control unit can be used to ensure that this stoichiometric mixture is maintained in the operational cases which may be relevant for each respective vehicle.

Furthermore, there is a general requirement, in connection with vehicles, to reduce the fuel consumption of a combustion engine to the greatest extent possible. To this end, engines possessing new types of combustion chambers in the cylinders of the engine have been developed in recent years, in particular for the purpose of being able to operate the engine using increasingly lean fuel mixtures, i.e. in which $\lambda>1$. In an engine of what is termed the lean-burn type (i.e. a directly injected Otto engine), each combustion chamber in the engine can be arranged such that the fuel which is supplied can be concentrated to a high degree at each respective ignition plug. This operational state is normally termed "stratified" operation and, when the engine is run continuously at low or medium torque and rotational speed, permits operation using a very lean air-fuel mixture, more specifically up to approximately $\lambda=3$. This results in a substantial economy in the fuel consumption in the case of this type of engine. The engine can also be operated in an additional, "homogeneous" operational state, either using a mixture which is in the main stoichiometric ($\lambda=1$) or a mixture which is relatively rich ($\lambda<1$). This latter operational state normally exists in situations in which the engine is being run at relatively high torques and rotational speeds. Certain additional states, apart from the stratified state and the homogeneous state, can also be met with in the case of a lean-burn engine.

In lean-burn engines, a conventional three-way catalyst cannot be used to reduce $NO_x$ compounds due to the fact that the catalyst is designed to have an optimum purifying ability when the mixture is stoichiometric. For this reason, an ordinary three-way catalyst can be combined with a nitrogen oxide adsorbent (also termed $NO_x$ adsorbent or "$NO_x$ trap"), which is a device, which is known per se, for absorbing $NO_x$ compounds, for example in the exhaust gases from a combustion engine. The $NO_x$ adsorbent can in this way be used as a complement to a conventional three-way catalyst, either as a separate unit upstream of the three-way catalyst or integrated with the three-way catalyst, i.e. together with the catalytic material belonging to the three-way catalyst. In the latter case, an integrated component is then constituted in the form of an $NO_x$-adsorbing exhaust gas catalyst.

It may be noted that the requirement with regard to reduction of $NO_x$ compounds is relevant in relation to different types of combustion engines, for example in the case of diesel engines as well as lean-burn engines as mentioned above. In such situations, therefore, it is not possible for a conventional three-way catalyst to function as a catalyst for reduction of $NO_x$ compounds.

An $NO_x$ adsorbent is constituted such that it takes up (adsorbs) $NO_x$ compounds in the exhaust gases if the engine is being operated with a lean air/fuel mixture and emits (desorbs) the $NO_x$ compounds If the engine is run, for a certain period of time, with a rich air/fuel mixture. Furthermore, the $NO_x$ adsorbent has the property that it can only absorb $NO_x$ compounds up to a certain limit; i.e., it is gradually "filled" and in this way reaches a limit to the adsorption. In this situation, the $NO_x$ adsorbent has to be regenerated; i.e., it has to be made to desorb and consequently release the stored $NO_x$ compounds. If, then, a conventional three-way catalyst is arranged downstream of an $NO_x$ adsorbent, or if, alternatively, a three-way catalyst is designed such that it is integrated with an $NO_x$ adsorbent, the desorbed $NO_x$ compounds can be eliminated by the three-way catalyst provided the latter has reached its ignition temperature.

According to the prior art, an $NO_x$ adsorbent can be regenerated by means of the exhaust gas mixture which is flowing through the $NO_x$ adsorbent being made relatively rich for a certain period of time, of the order of size of a few seconds. In practice, this is done by the engine being operated in the abovementioned homogeneous operational state for this period of time; i.e., with the engine consequently being operated with a relatively rich air/fuel mixture. In this way, the $NO_x$ adsorbent is "emptied" such that it can subsequently adsorb $NO_x$ compounds for a certain time which continues until a new regeneration becomes necessary.

Although the abovementioned procedure for regenerating $NO_x$ compounds functions well per se, it suffers from a disadvantage in that it negatively effects the fuel consumption of the engine because it is based on the engine having to be operated with a rich exhaust gas mixture at certain intervals. There is consequently a need for alternative methods for achieving an efficient reduction of $NO_x$ compounds in exhaust gases having a relatively large excess of oxygen, as is the case with lean-burn engines and diesel engines. A similar situation exists in the case of other combustion processes involving $NO_x$ compounds in an excess of oxygen, for example in connection with incineration plants, combined power and heating plants, residential boilers, flue gas purification and the like.

SUMMARY OF THE INVENTION

A primary object of the present invention is to provide an improved device for catalytically purifying $NO_x$ compounds and in which the abovementioned requirements are satisfied and problems solved.

The abovementioned object is achieved using a catalyst unit of the type mentioned in the introduction, which unit is characterized in that it comprises (includes, but is not necessarily limited to) at least a first reaction zone containing the catalytically active material and at least one second reaction zone which is arranged to permit breakdown of a gas species which is formed in the first reaction zone, with $N_2$ being formed, and in that the gas stream is conducted through the first reaction zone and the second reaction zone.

The above object is also achieved using a catalyst unit of the type mentioned in the introduction, which unit is characterized in that the catalyst unit comprises a structure that is arranged with channels containing an internal layer of the catalytically active material, with the structure also comprising further material which permits breakdown of a gas species which is formed in the layer, and with $N_2$ being formed in connection with the breakdown.

The invention achieves certain advantages. First and foremost, it can be noted that the invention affords efficient reduction of $NO_x$ compounds in exhaust gases from a combustion engine. The particular application of the invention is in connection with purifying exhaust gases from lean-burn engines and diesel engines whose exhaust gases exhibit a relatively large oxygen excess.

BRIEF DESCRIPTION OF DRAWINGS

The invention will be described below with reference to preferred embodiments and to the enclosed figures, in which:

FIG. 1 shows, in diagrammatic form, a device configured according to the present invention, and in accordance with a first embodiment;

FIG. 2 shows, in diagrammatic form, a device configured according to the present invention, and in accordance with a second embodiment;

DETAILED DESCRIPTION OF THE INVENTION

Figure 3:
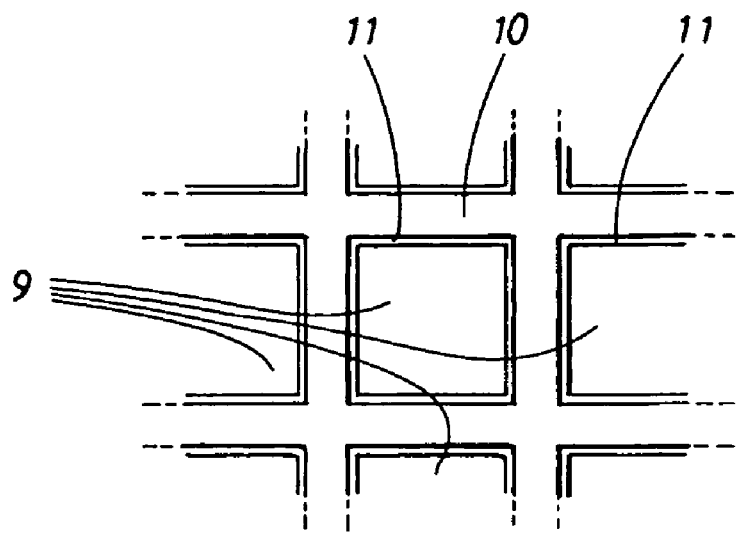
FIG. 3 shows an enlarged cross sectional view as seen along the line I-I in FIG. 1.

The present invention will now be described with reference to preferred embodiments thereof. The invention is intended to be used in connection with a combustion engine which is not shown in the figures, but which can consist of a petrol engine of the lean-burn type or, alternatively, of a diesel engine. In these two types of engine, there is a need for a decrease in the content of $NO_x$ compounds in an exhaust gas stream which contains a relatively large excess of oxygen. However, the principle behind the invention is not limited to being used only with these two engine types but can also be applied to a conventional petrol engine. Nor is the invention limited to being used solely in connection with vehicles; on the contrary, it can also be applied, for example, in connection with incineration plants, combined power and heating plants, residential boilers or flue gas purification, in connection with which a gas stream containing $NO_x$ compounds in an oxygen excess is generated.

As can be seen from FIG. 1, the present invention consists of a catalyst unit 1 which is intended, in a conventional manner, to be placed downstream of a combustion engine (not shown); i.e., along the outgoing exhaust pipe 2 of the combustion engine. An exhaust gas stream from the combustion engine is then conducted along the exhaust pipe 2 in the direction which is indicated by an arrow in FIG. 1. According to a first embodiment, the catalyst unit 1 is composed of at least one first reaction zone which expediently consists of a number (plurality) of catalytic components, what are termed catalytic beds 3a, 3b, 3c, 3d and 3e, which are arranged in the longitudinal direction of the catalyst unit 1 and which are separated by a corresponding number of second reaction zones which in turn consist of gas phase reactors 4a, 4b, 4c, 4d and 4e and which are arranged, respectively, downstream of the catalytic beds 3a, 3b, 3c, 3d and 3e.

The first catalytic bed 3a forms, together with the following first gas phase reactor 4a, a catalytically active unit which, as will be described below, is able to convert and reduce a certain quantity of $NO_x$ compounds in the exhaust gas stream. Similar catalytically active units are defined by the other catalytic beds 3b, 3c, 3d and 3e and gas phase reactors 4b, 4c, 4d and 4e, as seen in FIG. 1. Each such catalytically active unit, which is formed by a catalytic bed (i.e. a first reaction zone) and a subsequent gas phase reactor (i.e. a second reaction zone) results in a decrease in the quantity of $NO_x$ compounds in the exhaust gas stream. This means that the total reduction in $NO_x$ compounds which is achieved using the catalyst unit 1 is given by the sum of the contributions which are obtained from the respective catalytic beds 3a, 3b, 3c, 3d and 3e and gas phase reactors 4a, 4b, 4c, 4d and 4e.

In accordance with what is shown in FIG. 1, and in accordance with that which will be described below, both the catalytic beds 3a, 3b, 3c, 3d and 3e and the gas phase reactors 4a, 4b, 4c, 4d and 4e are, for example, five in number, with this then corresponding to five catalytically active units for decreasing $NO_x$ compounds. However, the principle behind the invention is not limited to a given number of the components; on the contrary, different numbers can be used. In a general manner, it can be stated that the decrease which is achieved in the $NO_x$ compounds in the exhaust gas stream is proportional to the number of units which are used. However, when the invention is being applied in practice in mass-produced vehicles, the length of the complete catalyst unit 1 (which length is in turn proportional to the number of catalytic beds and gas phase reactors) also has to be chosen while paying regard to limiting factors such as available space in the vehicle and permitted cost.

The catalyst unit 1 furthermore comprises an inlet 5 for supplying exhaust gases from the combustion engine in question and an outlet 6 for an outgoing, purified exhaust gas stream. The catalyst unit 1 preferably also includes an oxidation catalyst 7, which is then arranged downstream of the last gas phase reactor 4e and in front of the outlet 6. Because the catalytic beds 3a, 3b, 3c, 3d and 3e, and the gas phase reactors 4a, 4b, 4c, 4d and 4e, are unable to affect the content of CO and HC compounds in the exhaust gases, the oxidation catalyst 7 is utilized for decreasing these CO and HC compounds. The oxidation catalyst 7 is of a type which is conventional per se, and is therefore not described in detail here.

The invention is not limited to a catalyst unit 1 which includes an integrated oxidation catalyst 7. For example, in certain applications, it can be expedient to use a three-way catalyst. The need for further purification of CO and HC compounds in the exhaust gases varies depending on the application in question.

Nor is the invention limited, either, to the oxidation catalyst 7 being designed in an integrated manner in the catalyst unit 1; i.e., inside the same physical unit as the catalytic beds and gas phase reactors. As an alternative, an oxidation catalyst can consist of an entirely separate unit which can then be placed downstream of a catalyst unit which comprises the catalytic beds and the gas phase reactors.

The catalytic beds 3a, 3b, 3c, 3d and 3e which are included in the catalyst unit 1 are preferably of the silver-alumina type; i.e., containing small clusters of silver or silver oxide which, together with aluminum oxide, form a catalytically active coating on a monolith having a channel structure in each respective catalytic bed 3a, 3b, 3c, 3d and 3e. It is per se previously known to use catalysts of the silver-alumina type for catalytically purifying $NO_x$ compounds. However, in contrast to the prior art, the present invention is based on a catalyst unit 1 being provided with double reaction zones (i.e. the abovementioned first reaction zone and the abovementioned second reaction zone), which are designed such that a particular chemical reaction is promoted, which reaction will be described in detail below. In this reaction, the quantity of $NO_x$ compounds is reduced with $N_2$ being formed. As shown in FIG. 1, one embodiment of the invention is based on using five catalytically active units; i.e., which each consist of one catalytic bed and one gas phase reactor. According to the embodiment which is shown in FIG. 1, the catalytic beds 3a, 3b, 3c, 3d and 3e are placed separately from each other in the longitudinal direction of the catalyst unit 1; i.e., in the direction of flow of the exhaust gas stream.

The function of the invention will now be described in detail while referring to FIG. 1. When the combustion engine in question is being operated, an exhaust gas stream will be conducted via the exhaust pipe 2 and into the catalyst unit 1. In a conventional manner, this exhaust gas stream will contain harmful, and therefore undesirable, gas components in the form of CO, HC and $NO_x$ compounds. When the exhaust gas stream reaches the first catalytic bed 3a, reactions take place involving NO and HC molecules which impinge on the surface of the silver/alumina substrate in the first catalytic bed 3a. These molecules will react to give an unstable intermediate in the form of an intermediate gas species. A substantial proportion of this intermediate is released from the surface into the gas phase. The intermediate gas species is unstable and will decompose, i.e. break down. In connection with this breakdown, $N_2$ is formed; i.e., an outcome which is favorable. CO is also formed in this reaction.

It has been found that the abovementioned reaction also takes place in the case of $NO_2$, which is also an undesirable gas component which is found in the exhaust gas stream. It is furthermore the case that the abovementioned reaction is in principle similar in regard to the majority of the HC compounds which occur in the exhaust gases from combustion engines of the relevant type.

A consequence of the abovementioned reaction in the first catalytic bed 3a, in connection with which the unstable gas species is formed, is that the gas species can return to the surface of the catalytic bed 3a. When this takes place, the nitrogen can once again be oxidized such that an $NO_x$ compound (NO or $NO_2$) is formed. This "backreaction", which leads to the reformation of $NO_x$ compounds, is undesirable and is to a great extent limited, in accordance with the invention, by means of the catalyst unit 1 being designed in a special way, as will now be described.

The first catalytic bed 3a has a certain length L1 which, together with its other dimensions, corresponds to a large proportion of the $NO_x$ compounds in the exhaust gas stream reacting with HC compounds on the surface of the first catalytic bed 3a, such that there is extensive formation of the abovementioned intermediate gas species. A specific value for the optimal length L1 of the first catalytic bed 3a is chosen in dependence on parameters such as its diameter and cell density, the expected rate of flow of the exhaust gas stream and the temperature and the like. These parameters, and as a result the precise value for the length L1, naturally vary depending on the application in question, for example depending on the engine type in question, on performance, on the expected running conditions, on the expected rate of flow of the exhaust gases, on the available space for the catalyst unit 1 in the vehicle in question and the like.

Irrespective of the actual dimensions in regard to the length L1, it is the case, in accordance with the invention, that the dwell time should preferably be optimized with regard to the temperature which pertains in the catalyst unit 1. As an alternative, it can be said that the proportion of the reactive gas species should be optimized in relation to the quantity of $NO_x$ compounds in the gas phase in order, in this way, to keep down the rate of the backreaction in relation to the rate of the desired reaction for generating $N_2$. In general, it can also be said that the completeness of the reaction is proportional to the length L1 which is selected.

When the exhaust gas stream gradually passes through the first catalytic bed 3a, such that the intermediate gas species is formed, the gas species will also begin to decompose such that $N_2$ results. At this stage, the exhaust gas stream also flows onwards to the first gas phase reactor 4a, in connection with which the decomposition of the gas species continues. Since the first gas phase reactor 4a does not contain any silver-alumina material, the backreaction is severely restricted, thereby favoring the formation of $N_2$. By means of practical experiments, it has been found that this decomposition takes place at a rate which is such that approximately fifty percent of the quantity of the gas species which is formed will be decomposed (with $N_2$ being released) in approximately 30 ms at a temperature of 350° C.

The catalyst unit 1 which is shown in FIG. 1 furthermore contains a first gas phase reactor 4a which has a predetermined length L2. This length L2 is chosen so as to ensure that a majority, preferably at least ninety percent, of the gas species has time to react; i.e., break down, and give rise to $N_2$ formation during the passage of the exhaust gas stream through the first gas phase reactor 4a. This thereby defines a certain dwell time for the exhaust gas such that it has time to react to form $N_2$ before it enters the next reaction zone which is defined by the next subsequent catalytic bed. However, the length L2 has to be chosen while paying regard, for example, to the available space in the vehicle in question. A suitable choice for the length L2 corresponds to the least possible remaining quantity of the gas species being allowed to impinge on the surface of the subsequent second catalytic bed 3b and give rise to undesirable reformation of $NO_x$ compounds. A specific value for the length L2 of the first gas phase reactor 4a can be determined while taking as a basis a certain expected rate of flow and temperature of the exhaust gas stream (which in turn depends on the engine type in question, etc.) and while taking as a basis the requirement that at least ninety percent, for example, of the gas species should decompose during passage of the exhaust gas stream through the first gas phase reactor 4a. However, other limit values than ninety percent, for example, are permissible within the scope of the invention.

The first catalytic bed 3a and the first gas phase reactor 4a together form a catalytically active unit for decreasing $NO_x$ compounds in the exhaust gas stream. As a result of the formation of the intermediate gas species, $NO_x$ compounds will be absorbed and $N_2$ will be emitted. Careful harmonization and optimization of the length L1 of the first catalytic bed 3a and the first gas phase reactor 4a, in dependence on, for example, the rate of flow and temperature of the exhaust gas stream and in dependence on other dimensions and parameters of the first catalytic bed 3a and the first gas phase reactor 4a, results in substantial conversion of $NO_x$ compounds in the exhaust gas stream and in a decrease in harmful discharges into the surrounding atmosphere.

The exhaust gas stream which has passed through the first catalytic bed 3a and the first gas phase reactor 4a still contains a certain quantity of $NO_x$ compounds. For this reason, the catalyst unit 1 preferably contains additional catalytically active units in the form of additional catalytic beds 3b, 3c, 3d and 3e and additional gas phase reactors 4b, 4c, 4d and 4e. The remaining quantity of $NO_x$ compounds which flows into the second catalytically active unit (which is formed by the second catalytic bed 3b and the second gas phase reactor 4b) will consequently to a large extent be eliminated by this second catalytically active unit. After that, the unit ensures that the gas species is decomposed (with $N_2$ being formed) during the passage of the exhaust gas stream through the second gas phase reactor 4b. After that, the process continues along the remaining catalytic beds 3c, 3d and 3e and gas phase reactors 4c, 4d and 4e, respectively. Consequently, it can be stated that the five gas phase reactors 4a, 4b, 4c, 4d and 4e define reaction zones whose length L2 and other dimensions are arranged to permit the above-described reaction in which the gas species breaks down and $N_2$ is formed.

As can be seen from FIG. 1, the five catalytic beds 3a, 3b, 3c, 3d and 3e are separated from each other in the longitudinal direction of the catalyst unit 1; i.e., in the direction of flow of the exhaust gas stream, with the spaces between the respective first reaction zones; i.e., the catalytic beds 3a, 3b, 3c, 3d and 3e, being bridged by the respective second reaction zones; i.e., the five corresponding gas phase reactors 4a, 4b, 4c, 4d and 4e. Each unit (consisting of one catalytic bed and one subsequent gas phase reactor) through which the exhaust gas stream passes results in a given conversion and elimination of $NO_x$ compounds. Practical experiments have shown that each such unit can give rise to a conversion of $NO_x$ compounds which can amount to the order of size of 70-80 percent, inter alia depending on the fuel which is used. More specifically, the invention has a function which implies that approximately 70-80 percent of the $NO_x$ compounds which are flowing through the exhaust pipe 2 will be absorbed in the first catalytically active unit 3a, 4a. The content of $NO_x$ in the exhaust gases will decrease during passage through the first catalytic bed 3a. After that, the $NO_x$ content in the exhaust gases will be at what is in the main a constant level when the exhaust gases pass through the first gas phase reactor 4a. After that, the $NO_x$ content will once again decrease by the order of size of 70-80 percent when the exhaust gases pass through the second catalytic bed 3b and the like. This means that the complete catalyst unit 1 can in total eliminate 99 percent or more of the $NO_x$ compounds which are present in the exhaust gas stream. Any quantity of the intermediate gas species which may remain can react back to $NO_x$ compounds on the oxidation catalyst 7.

According to the embodiment which is shown in FIG. 1, the gas phase reactors 4a, 4b, 4c, 4d and 4e are empty; i.e., they consist of tubular connections which have a given length L2 and which are arranged as reaction zones between each respective catalytic bed 3a, 3b, 3c, 3d and 3e. According to an alternative embodiment of the invention, which is shown in FIG. 2, use is made of gas phase reactors which contain a second catalytic material (decomposition catalyst) which promotes the decomposition of the gas species into nitrogen gas. This second catalytic material can be a material which, by means of adsorption, accelerates the breakdown reaction itself and/or the dwell time of the gas species in the second reaction zone such that a larger proportion of the gas species has time to react to form $N_2$ before entry into the subsequent catalytic bed. This thereby defines alternative gas phase reactors 8a, 8b, 8c, 8d and 8e, as shown in FIG. 2. These gas phase reactors 8a, 8b, 8c, 8d and 8e consequently have a favorable effect on $N_2$ formation.

The embodiment as shown in FIG. 2 is consequently based on the principle that each respective gas phase reactor 8a, 8b, 8c, 8d and 8e defines a second reaction zone which is designed with a material which is able to accelerate and accomplish the abovementioned reaction in the respective gas phase reactor; i.e., the desired decomposition of the intermediate gas species such that $N_2$ is formed. A second catalytic material which is suitable for this purpose is a material which does not contain any sites for oxidation, nor any acidic sites. If anything, it is expedient to use a basic catalyst. While preference is given to using silicon carbide or gold for this purpose, the invention is not limited to these materials alone. For example, it is possible to use materials of the silicalite or base metal oxide (MgO, CaO, BaO, etc.) type. In addition, it is possible to use active charcoal or soot for this purpose. It is furthermore the case that each respective gas phase reactor 8a, 8b, 8c, 8d and 8e can consist of separate catalytic monoliths or, alternatively, consist of a rear part of each respective catalytic bed 3a, 3b, 3c, 3d and 3e (FIG. 2); i.e., where each respective rear part has been immersed in a suitable decomposition catalyst.

In the embodiment shown in FIG. 2, the decomposition of the gas species will take place relatively rapidly as a result of the abovementioned materials being used in each respective $N_2$-forming gas phase reactor 8a, 8b, 8c, 8d and 8e. This also means, for example, that the length L3 of each respective gas phase reactor 8a, 8b, 8c, 8d and 8e can be made shorter than the length L2 of the gas phase reactors 4a, 4b, 4c, 4d and 4e as shown in FIG. 1. This in turn means that the embodiment shown in FIG. 2 exhibits an advantage in that the complete catalyst unit 1' can be made shorter than what is shown in FIG. 1; alternatively, it means that a catalyst unit 1' which is of the same total length as the catalyst unit 1 shown in FIG. 1 can contain more catalytically active units (in turn consisting of a catalytic bed and a gas phase reactor) than the embodiment shown in FIG. 1.

In a manner which is analogous to that shown in FIG. 1, the embodiment shown in FIG. 2 can contain an oxidation catalyst 7 which is placed downstream of the last gas phase reactor 8e. Alternatively, it is possible to use a three-way catalyst. Likewise, an oxidation catalyst can consist of a component which is physically integrated with the catalyst unit 1', as shown in FIG. 2, or of a separate component, which is then arranged downstream of the catalytic beds and gas phase reactors which are used. Because the catalytic beds 3a, 3b, 3c, 3d and 3e and the gas phase reactors 8a, 8b, 8c, 8d and 8e are not designed for decreasing the content of CO and HC compounds in the exhaust gases, the oxidation catalyst 7 is used for decreasing these CO and HC compounds.

FIG. 3 shows a cross sectional view through one of the above-mentioned catalytic beds (3e), which cross section is indicated by the line I-I in FIG. 1. More specifically, FIG. 3 shows an enlarged partial view of a number of channels 9 along such a cross section I-I. In a manner which is per se previously known, each respective catalytic bed (cf. the reference number 3e in FIG. 1) is composed of a supporting structure 10 which is in turn composed of cordierite. This supporting structure 10 defines the channels 9, which preferably exhibit a cross section which is in the main square in shape. The inner side of each respective channel 9 is coated with a thin layer 11 of the catalytically active silver/alumina material.

Figure 4:
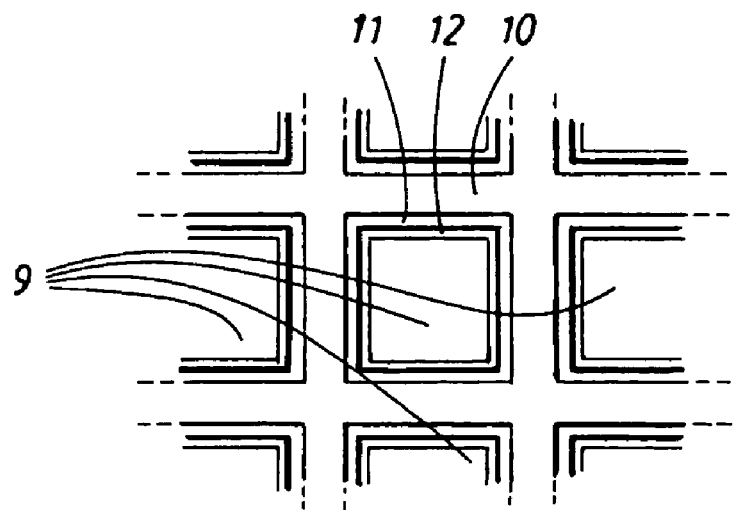
FIG. 4 shows a cross sectional view which principally corresponds to FIG. 3, but which shows an alternative, third embodiment of the invention.

FIG. 4 shows a cross section which in the main corresponds to FIG. 3 but which illustrates a third embodiment of the invention. This third embodiment differs from the abovementioned embodiments by containing a decomposition layer 12 which covers the abovementioned layer 11 composed of silver/alumina. The purpose of the decomposition layer 12 is to accelerate and facilitate decomposition of the intermediate gas species such that $N_2$ can be formed efficiently. In a manner which is analogous to the gas phase reactors 8a, 8b, 8c, 8d and 8e which are shown in FIG. 2, the decomposition layer 12 which is shown in FIG. 4 is elaborated from a material which is able to accelerate and facilitate this decomposition. Substances of the different types, as specified above (for example silicon carbide or gold), are then used for the decomposition layer 12. In addition, the decomposition layer 12 is preferably porous, thereby permitting passage of gas to the underlying layer 11, where catalytic reaction takes place.

In a manner corresponding to the way in which the decomposition of the gas species in accordance with the embodiment shown in FIG. 1 is provided with space in the longitudinal direction of the catalyst unit 1, the arrangement shown in FIG. 4 will provide space for the decomposition in the transverse direction in each respective channel 9. This means that the arrangement shown in FIG. 4 does not need to be based on a number of catalytic beds which are arranged separately from each other. Instead, one single monolith designed as shown in FIG. 4 can be arranged so as to obtain the desired, above-described formation of $N_2$.

In accordance with an alternative to that shown in FIG. 4, the layers 11, 12 can be arranged in the opposite manner such that the decomposing layer 12 is placed underneath; i.e., closest to the cordierite structure 10, while the silver/alumina layer 11 is placed on top.

Figure 5:
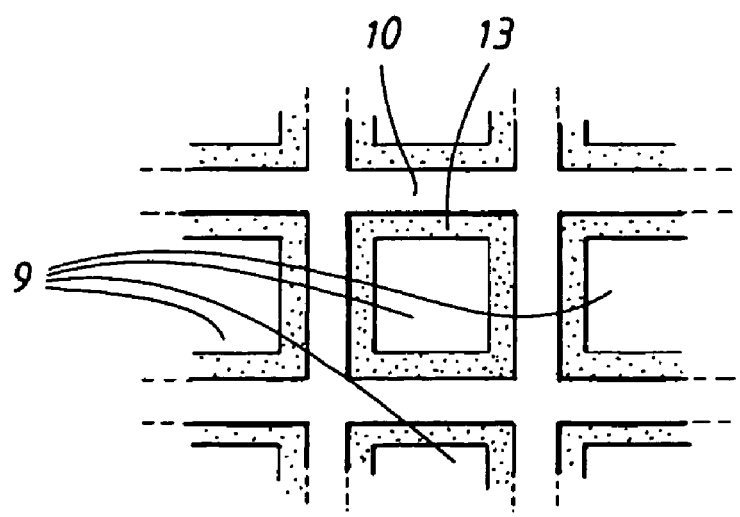
FIG. 5 shows a cross sectional view which principally corresponds to FIGS. 3 and 4, but which shows a fourth embodiment of the invention.

A fourth embodiment of the invention is shown in FIG. 5, which is a cross section which principally corresponds to FIGS. 3 and 4 but which contains an alternative layer 13 arranged on the cordierite structure 10. This layer 13 consists of an integrated material which in turn consists of the catalytically active silver/alumina material and a decomposition material of the same type as in the abovementioned decomposition layer (cf. FIG. 4); i.e., silicon carbide or gold. This fourth embodiment also results in decomposition of the intermediate gas species such that $N_2$ is formed efficiently in each respective catalytic bed.

The embodiments which are described with reference to FIGS. 4 and 5 can also be said to contain first and second reaction zones; i.e., in the form of the different layers 11, 12 and 13, as shown in the figures. For example, the layer 11 (FIG. 4) can be said to constitute a first reaction zone while the layer 12 constitutes a second reaction zone. The former layer 11 contains catalytic material of the silver-alumina type while the second layer 12 contains a material which promotes $N_2$ formation, as described above. The gas is allowed to move between and diffuse through the different layers. The reaction zones can consequently consist of very small regions or zones through which the gas is allowed to pass. The embodiment shown in FIG. 5 can also be said to exhibit first and second reaction zones; i.e., the regions within the layer 13 which have a catalytic and, respectively, an $N_2$-promoting effect, with gas being permitted to move alternately in the first and second reaction zones, respectively.

The embodiments which are shown in FIGS. 4 and 5, respectively, indicate conceivable designs of respective channels 9 in the catalytic beds 3a, 3b, 3c, 3d and 3e which are shown in FIGS. 1 and 2. Each of the embodiments shown in FIGS. 4 and 5 can be combined with the structure which is shown in FIG. 1; i.e., with alternating catalytic beds and gas phase reactors, or with the structure which is shown in FIG. 2; i.e., with alternating catalytic beds 3a, 3b, 3c, 3d and 3e and decomposition catalysts 8a, 8b, 8c, 8d and 8e. However, it should be emphasized that the embodiments shown in FIGS. 4 and 5 can be implemented without using any intercalated gas phase reactors; i.e., without any intercalated reaction zones. Expediently, each respective catalyst unit is constructed on the basis of the cordierite structure 10, as shown in FIGS. 4 and 5, respectively, being a single monolith.

In summary, it can be stated that the invention primarily aims to be used for converting; i.e., reduction of, $NO_x$ compounds so that $N_2$ is formed. As indicated above, the invention is based on the realization that an unstable intermediate gas species is formed when $NO_x$ and HC react at the surface of the catalyst; i.e., at the silver/alumina surface. This gas species is to a large extent reformed into $NO_x$ if it returns to the catalyst surface whereas it breaks down to a large extent, with the formation of $N_2$, if it remains at a distance from the surface. An important principle behind the invention, which is evident from FIGS. 1 and 2 and the abovementioned description, is to ensure that the gas species which has been formed is kept away from the surface of the catalyst. If the gas species can be kept at a distance from the catalyst surface for sufficiently long, it then has time to decompose into $N_2$. According to one embodiment of the invention, this is achieved by allowing the gas to flow alternately through regions which do and do not contain catalyst. As a result, the gas species is carried away, as it is formed, from the surface, with care being taken to ensure that the dwell time of the gas species is sufficiently long for $N_2$ to have time to be formed before the gas species reaches the catalyst surface once again.

In order to further extend the dwell time, the arrangement can, in accordance with the invention, be supplemented with a material at which the gas species is adsorbed. For example, silicon carbide or gold can be used for this purpose. This material can be arranged on separate $N_2$-forming gas phase reactors (which are indicated by the reference numbers 8a, 8b, 8c, 8d and 8e in FIG. 2) or, alternatively, on the channels which are included in the respective catalyst (see the reference numbers 12 and 13 in FIG. 4 and FIG. 5, respectively). In the latter case, this material can be designed as a separate layer (FIG. 4) or as a layer which is integrated with the catalytic silver/alumina material (FIG. 5).

According to preferred embodiments of the invention, the desired conversion of $NO_x$ to $N_2$ is achieved either by means of a number of catalytic beds being arranged at intervals from each other, with the intervals being bridged by specially designed reaction zones, or by means of a catalyst unit being provided with material which promotes and completes the formation of $N_2$. In accordance with the former variant, the exhaust gas is allowed to alternately pass through a silver-alumina catalyst which is active for selective $NO_x$ reduction and alternately pass through a catalyst or zone for completing the formation of $N_2$ from the intermediate gas species. The abovementioned reaction zones can in turn consist of gas phase reactors (FIG. 1) or decomposition catalysts (FIG. 2). In addition, the course of the decomposition of the intermediate gas species can be facilitated if the catalytic beds are designed such that they include a material which corresponds to the active material in the gas phase reactors. This results in the efficient elimination of $NO_x$ compounds from an exhaust gas stream, in connection with which it is also possible to limit any backreaction for forming $NO_x$ compounds.

In accordance with an alternative embodiment of the invention (which is not shown in the figures), it is possible to supply a suitable reducing agent in front of one or more of the catalytic beds which are shown in FIGS. 1 and 2. This can expediently be implemented with the aid of a connection between a fuel tank which is present in the vehicle and an attachment point in front of, for example upstream of, the catalytic bed(s) where the reducing agent is to be supplied. The metering to each respective attachment point can be regulated using a control unit which is connected to suitable valve devices at each respective attachment point. By means of supplying such a reducing agent, expediently in the form of the normal fuel for the engine, an advantage is obtained in this way in that the absolute concentration is then as low as possible, something which in turn minimizes the risk of self poisoning. The variant involving supplying reducing agent can also be implemented in the embodiments shown in FIGS. 4 and 5.

According to another variant of the invention, hydrogen can be supplied to each respective catalytic bed in a manner which is analogous to that for supplying reducing agent. In particular, it is advantageous to supply hydrogen to at least one of the gas phase reactors shown in FIG. 2, in particular in connection with the operational cases which are characterized by a relatively low temperature (approx. 200-350° C.).

When the invention is designed such that it involves supplying reducing agent or hydrogen, this supply can be affected at one or more catalytic beds. The supply can also be affected such that different quantities are metered in at different catalytic beds.

When the invention is designed such that it involves supplying reducing agent or hydrogen, each respective catalyst unit can in addition expediently be provided with an $NO_x$ sensor; i.e., a sensor for detecting the prevailing concentration of $NO_x$ compounds at a suitable point along the catalyst unit. A signal which corresponds to this concentration can be fed to a control unit which is in turn arranged, for example, to meter the reducing agent from the tank of the vehicle in a manner which is optimized with regard, for example, to $NO_x$ formation, $NO_x$ reduction and $N_2$ generation. An $NO_x$ sensor of this nature can then also be used when diagnosing the system.

According to another variant, a control unit of the abovementioned type, which is used for controlling, in a manner known per se, the combustion process, the ignition process, fuel injection and the like can be designed, in connection with the present invention, for guiding the temperature of the exhaust gas to a level which is advantageous for the abovementioned reactions. In other words, a control unit of this nature can be used so as to ensure that the temperature of the exhaust gas is sufficiently high for the exhaust gas catalyst in turn to be heated to a temperature at which the reactions are satisfactory.

Furthermore, the catalyst unit can, in accordance with the invention, be supplemented with an HC adsorbent in order, in this way, to make use of HC compounds even at relatively low temperatures. Such an HC adsorbent can in this case be designed such that it is integrated with the remainder of the catalyst unit or, alternatively, designed as a separate subsequent unit.

In accordance with another embodiment of the invention, the latter can be implemented in connection with a supporting structure of the metal monolith type; i.e., a metallic catalytic body. This is a construction which is known per se and which uses a plane metal sheet and a pleated metal sheet which are together shaped into the desired structure. According to another embodiment of the present invention, this structure can be designed such that the pleated sheet is coated with silver-alumina material and the plane sheet is coated with the abovementioned $N_2$-forming material, or vice versa. Plane sheets and pleated sheets can be arranged on top of each other as a laminate, thereby obtaining a structure possessing insulated layers.

The invention is not limited to the above-described embodiments but can be varied within the scope of the subsequent patent claims. For example, the number of catalytic beds, gas phase reactors and decomposition catalysts can vary. Likewise, dimensions and other parameters of the appurtenant components can vary within the scope of the invention. For example, while the layers 11, 12 and 13 which are shown in FIGS. 3-5 can have a thickness which is of the order of size of 10-40 μm, this dimension can vary depending on the application.

Instead of a second reaction zone, it is possible to make use of a supply of hydrogen. When hydrogen is supplied in this way, there is no gas-phase decomposition of the gas species in question.

What is claimed is:

1. A catalyst unit configured for reducing $NO_x$ compounds in an internal combustion engine's exhaust gas stream, comprising:

at least one first zone having a support structure with a first catalytically active material of the silver/alumina type supported by the support structure, and at least one second zone which is located downstream of an immediately preceding first zone, wherein the catalyst unit is arranged such that the exhaust gas stream is conducted through the first zone or zones and the second zone or zones, wherein interaction of the exhaust gas stream with the first catalytically active material produces an unstable intermediate gas species that breaks down into $N_2$, and wherein each second zone is a space that is 1) free of any device that acts on the unstable intermediate gas product in such a way as to foster or promote breakdown of the unstable intermediate gas product into $N_2$, and 2) that is long enough such that the majority of the unstable intermediate gas species that is formed by interaction of the exhaust gas stream with the first catalytically active material in the immediately preceding first zone will have broken down into $N_2$ by the time the exhaust gas stream has reached the downstream end of the second zone.

2. The catalyst unit as recited in claim 1, wherein the support structure in each of the first zones has channels extending through it and a layer of said first catalytically active material disposed directly on the surfaces of walls that define said channels.

3. The catalyst unit as recited in claim 2, further comprising a layer of a second catalytic material disposed over and in contact with the layer of said first catalytically active material, the second catalytic material being such as to promote breakdown of the unstable intermediate gas species into $N_2$.

4. The catalyst unit as recited in claim 3, wherein the second catalytic material is a $NO_x$-adsorbing material.

5. The catalyst unit as recited in claim 3, wherein said second catalytic material is a non-oxidizing material.

6. The catalyst unit as recited in claim 3, wherein the second catalytic material consists of at least one of silicon carbide, gold, silicalite, base metal oxide, active charcoal, and soot.

7. The catalyst unit as recited in claim 1, wherein said catalyst unit is configured to supply a reducing agent upstream of at least the upstream-most first reaction zone.

8. The catalyst unit as recited in claim 1, further comprising a $NO_x$ sensor for generating a signal which corresponds to the $NO_x$ concentration which pertains to the catalyst unit.

9. The catalyst unit as recited in claim 1, wherein said catalyst unit is connected to an HC adsorbent.

10. The catalyst unit of claim 1, wherein each second zone is free of catalytic material.

11. The catalyst unit as recited in claim 10, wherein each second zone is empty space.

12. The catalyst unit as recited in claim 1, wherein the support structure in each of the first zones has channels extending through it and a layer of a second catalytic material disposed directly on the surfaces of walls that define said channels, the second catalytic material being such as to promote breakdown of the unstable intermediate gas species into $N_2$ and the layer of first catalytically active material being disposed over and in contact with the layer of said second catalytically active material.

13. The catalyst unit as recited in claim 12, wherein the second catalytic material is a $NO_x$-adsorbing material.

14. The catalyst unit as recited in claim 12, wherein said second catalytic material is a non-oxidizing material.

15. The catalyst unit as recited in claim 12, wherein the second catalytic material consists of at least one of silicon carbide, gold, silicalite, base metal oxide, active charcoal, and soot.

16. The catalyst unit as recited in claim 1, wherein the support structure in each of the first zones has channels extending through it and a layer of catalytic material disposed directly on the surfaces of walls that define said channels, the layer of catalytic material being an integrated material consisting of said first catalytically active material of the silver/alumina type and a second catalytic material that promotes breakdown of the unstable intermediate gas species into $N_2$.

17. The catalyst unit as recited in claim 16, wherein the second catalytic material is a $NO_x$-adsorbing material.

18. The catalyst unit as recited in claim 16, wherein said second catalytic material is a non-oxidizing material.

19. The catalyst unit as recited in claim 16, wherein the second catalytic material consists of at least one of silicon carbide, gold, silicalite, base metal oxide, active charcoal, and soot.

20. The catalyst unit as recited in claim 1, wherein the support structure is made from cordierite.

21. The catalyst unit as recited in claim 1, wherein the first catalytically active material contains small clusters of silver or silver oxide with aluminum oxide.

22. The catalyst unit as recited in claim 1, wherein said majority is a substantial majority.

23. The catalyst unit as recited in claim 22, wherein said substantial majority is on the order of 90 percent.

24. A motor vehicle, comprising:
an internal combustion engine; and
a catalyst unit configured and disposed to receive and purify an exhaust gas stream produced by the internal combustion engine,
wherein said catalyst unit comprises
at least one first zone having a support structure with a first catalytically active material of the silver/alumina type supported by the support structure, and
at least one second zone which is located downstream of an immediately preceding first zone,
wherein the catalyst unit is arranged such that the exhaust gas stream is conducted through the first zone or zones and the second zone or zones,
wherein interaction of the exhaust gas stream with the first catalytically active material produces an unstable intermediate gas species that breaks down into $N_2$, and
wherein each second zone is a space that is 1) free of any device that acts on the unstable intermediate gas product in such a way as to foster or promote breakdown of the unstable intermediate gas product into $N_2$, and 2) that is long enough such that the majority of the unstable intermediate gas species that is formed by interaction of the exhaust gas stream with the first catalytically active material in the immediately preceding first zone will have broken down into $N_2$ by the time the exhaust gas stream has reached the downstream end of the second zone.

25. The motor vehicle as recited in claim 24, wherein each second zone is free of catalytic material.

26. The motor vehicle as recited in claim 25, wherein each second zone is empty space.

27. The motor vehicle as recited in claim 26, further comprising a layer of a second catalytic material disposed over and in contact with the layer of said first catalytically active material, the second catalytic material being such as to promote breakdown of the unstable intermediate gas species into $N_2$ and consisting of at least one of silicon carbide, gold, silicalite, base metal oxide, active charcoal, and soot.

28. The motor vehicle as recited in claim 24, wherein the support structure in each of the first zones has channels extending through it and a layer of said first catalytically active material disposed directly on the surfaces of walls that define said channels.

29. The motor vehicle as recited in claim 24, wherein the support structure in each of the first zones has channels extending through it and a layer of a second catalytic material disposed directly on the surfaces of walls that define said channels, the second catalytic material being such as to promote breakdown of the unstable intermediate gas species into $N_2$ and the layer of first catalytically active material being disposed over and in contact with the layer of said second catalytically active material, the second catalytic material consisting of at least one of silicon carbide, gold, silicalite, base metal oxide, active charcoal, and soot.

30. The motor vehicle as recited in claim 24, wherein the support structure in each of the first zones has channels extending through it and a layer of catalytic material disposed directly on the surfaces of walls that define said channels, the layer of catalytic material being an integrated material consisting of said first catalytically active material of the silver/alumina type and a second catalytic material that promotes breakdown of the unstable intermediate gas species into $N_2$, the second catalytic material consisting of at least one of silicon carbide, gold, silicalite, base metal oxide, active charcoal, and soot.

31. The motor vehicle as recited in claim 24, wherein said majority is a substantial majority.

32. The motor vehicle as recited in claim 31, wherein said substantial majority is on the order of 90 percent.

* * * * *